United States Patent
Ostertun et al.

(10) Patent No.: US 9,983,820 B2
(45) Date of Patent: May 29, 2018

(54) METHOD FOR PERFORMING DATA UPDATES

(71) Applicant: NXP B.V., Eindhoven (NL)

(72) Inventors: Sönke Ostertun, Wedel (DE); Wolfgang Stidl, Hamburg (DE); Raffaele Costa, Eindhoven (NL)

(73) Assignee: NXP B.V., Eindhoven (NL)

( * ) Notice: Subject to any disclaimer, the term of this patent is extended or adjusted under 35 U.S.C. 154(b) by 37 days.

(21) Appl. No.: 15/084,440

(22) Filed: Mar. 29, 2016

(65) Prior Publication Data

US 2017/0285996 A1 Oct. 5, 2017

(51) Int. Cl.
| | |
|---|---|
| *G06F 12/00* | (2006.01) |
| *G06F 3/06* | (2006.01) |
| *G06F 11/10* | (2006.01) |
| *G06F 12/1009* | (2016.01) |
| *G06F 12/02* | (2006.01) |
| *G06F 12/1027* | (2016.01) |

(52) U.S. Cl.
CPC .......... *G06F 3/0632* (2013.01); *G06F 3/0619* (2013.01); *G06F 3/0644* (2013.01); *G06F 3/0653* (2013.01); *G06F 3/0685* (2013.01); *G06F 11/1004* (2013.01); *G06F 12/0246* (2013.01); *G06F 12/1009* (2013.01); *G06F 12/1027* (2013.01); *G06F 2212/1032* (2013.01); *G06F 2212/2022* (2013.01); *G06F 2212/7201* (2013.01); *G06F 2212/7204* (2013.01); *G06F 2212/7209* (2013.01)

(58) Field of Classification Search
None
See application file for complete search history.

(56) References Cited

U.S. PATENT DOCUMENTS

| | | | |
|---|---|---|---|
| 5,930,833 A * | 7/1999 | Yoshioka | G06F 12/1063 711/141 |
| 2002/0024844 A1 | 2/2002 | Saeki | |
| 2004/0123020 A1 | 6/2004 | Gonzalez et al. | |
| 2006/0271725 A1 | 11/2006 | Wong | |
| 2008/0288717 A1* | 11/2008 | Torabi | G06F 12/0246 711/103 |
| 2009/0119450 A1 | 5/2009 | Saeki et al. | |
| 2011/0145541 A1* | 6/2011 | Ito | G06F 12/1009 711/203 |
| 2014/0258587 A1 | 9/2014 | Baryudin et al. | |

OTHER PUBLICATIONS

Extended European Search Report for Patent Appln. No. 17153822.6 (Jul. 20, 2017).

* cited by examiner

*Primary Examiner* — Brian Peugh (57) ABSTRACT

In an embodiment, a method for re-programming memory is disclosed. In the embodiment, the method involves selecting a memory page based on version information and re-programming the selected memory page using cyclic redundancy check (CRC) data for the memory page.

20 Claims, 8 Drawing Sheets

METHOD FOR PERFORMING DATA UPDATES

BACKGROUND

Many devices utilize nonvolatile memory to store information that is later updated or changed. For example, smart card technology utilizes nonvolatile memory in a small embedded integrated circuit (e.g., embedded in a pocket-sized card) to store regularly updated information, which allows for advanced functionality such as payment, data storage, or authentication. Typically, in order to update the information stored in nonvolatile memory on such devices (e.g., smart cards, prepaid vending machines, ski-pass devices, etc.), the devices communicate with a data source (e.g., a smart card reader) using either contact communication or contactless communication. For example, a smart card can communicate with a smart card reader either when inserted into the smart card reader or by using RF induction or near-field communication to communicate with the smart card reader without contact.

SUMMARY

In an embodiment, a method for resolving collisions resulting from tearing events when updating memory is disclosed. In the embodiment, the method involves selecting a memory page from a plurality of memory pages pointing to a logical memory page based on version information, re-programming the selected memory page, and mapping the selected memory page to the logical memory page.

In a second embodiment, the memory page is further selected based on performance under a quality read operation.

In another embodiment, the method further comprises re-programming the selected memory page using cyclic redundancy checked (CRC) data for the memory page obtained by performing a normal read operation of the page.

In another embodiment, if CRC data for the selected memory page (first memory page) cannot be obtained by a normal read operation, selecting a second memory page from the plurality of memory pages pointing to the logical memory page and re-programming the second memory page using CRC data obtained by performing a normal read operation of the second memory page.

In another embodiment, the selected memory page is verified with a quality read operation and, if the page cannot be verified, re-programming the memory page.

In another embodiment, the method further comprises determining if a tearing event has occurred by reading data programmed to a system page before selecting the memory page.

In another embodiment, a validity check is performed before re-programming the memory page.

In another embodiment, the validity check is performed by evaluating a validity check flag stored in an XWORD of the memory page.

In another embodiment, the validity check is performed by comparing CRC data calculated from the memory page to CRC data stored in an XWORD of the memory page.

In another embodiment, a non-transitory computer-readable storage medium is disclosed. In the embodiment, the non-transitory computer-readable storage medium includes instructions that, when executed by a processor, cause the processor to perform steps including selecting a memory page from a plurality of memory pages pointing to a logical memory page based on version information, re-programming the selected memory page, and mapping the selected memory page to the logical memory page.

In another embodiment, the memory page is further selected based on performance under a quality read operation.

In another embodiment, the memory page is selected from a plurality of physical memory pages that are mapped to the same logical memory page.

In another embodiment, the non-transitory computer-readable storage medium further comprises instructions for re-programming the selected memory page using cyclic redundancy checked data obtained by performing a normal read operation of the page.

In another embodiment, the selected memory page is verified with a quality read operation and, if the page cannot be verified, re-programming the memory page.

In another embodiment, if cyclic redundancy checked data for the selected memory page (first memory page) cannot be obtained by a normal read operation, selecting a second memory page from the plurality of memory pages pointing to the logical memory page and re-programming the second memory page using cyclic redundancy checked data obtained by performing a normal read operation of the second memory page.

In another embodiment, an occurrence of a tearing event is determined by reading data programmed to a system page before selecting the memory page.

In another embodiment, a validity check is performed before re-programming the memory page.

In another embodiment, the validity check is performed by evaluating a validity check flag stored in an XWORD of the memory page.

In another embodiment, the validity check is performed by comparing CRC data calculated from the memory page to CRC data stored in an XWORD of the memory page.

In another embodiment, an integrated circuit comprising a processor and memory is disclosed. In the embodiment, the memory includes instructions that, when executed by the processor, perform steps involving selecting a memory page from a plurality of memory pages pointing to a logical memory page based on version information, re-programming the selected memory page, and mapping the selected memory page to the logical memory page.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

For simplicity, the described features, advantages, and characteristics of the invention are described throughout this specification as implemented within a smart card, but could be implemented in other devices that utilize non-volatile memory to store and update information.

Figure 1:
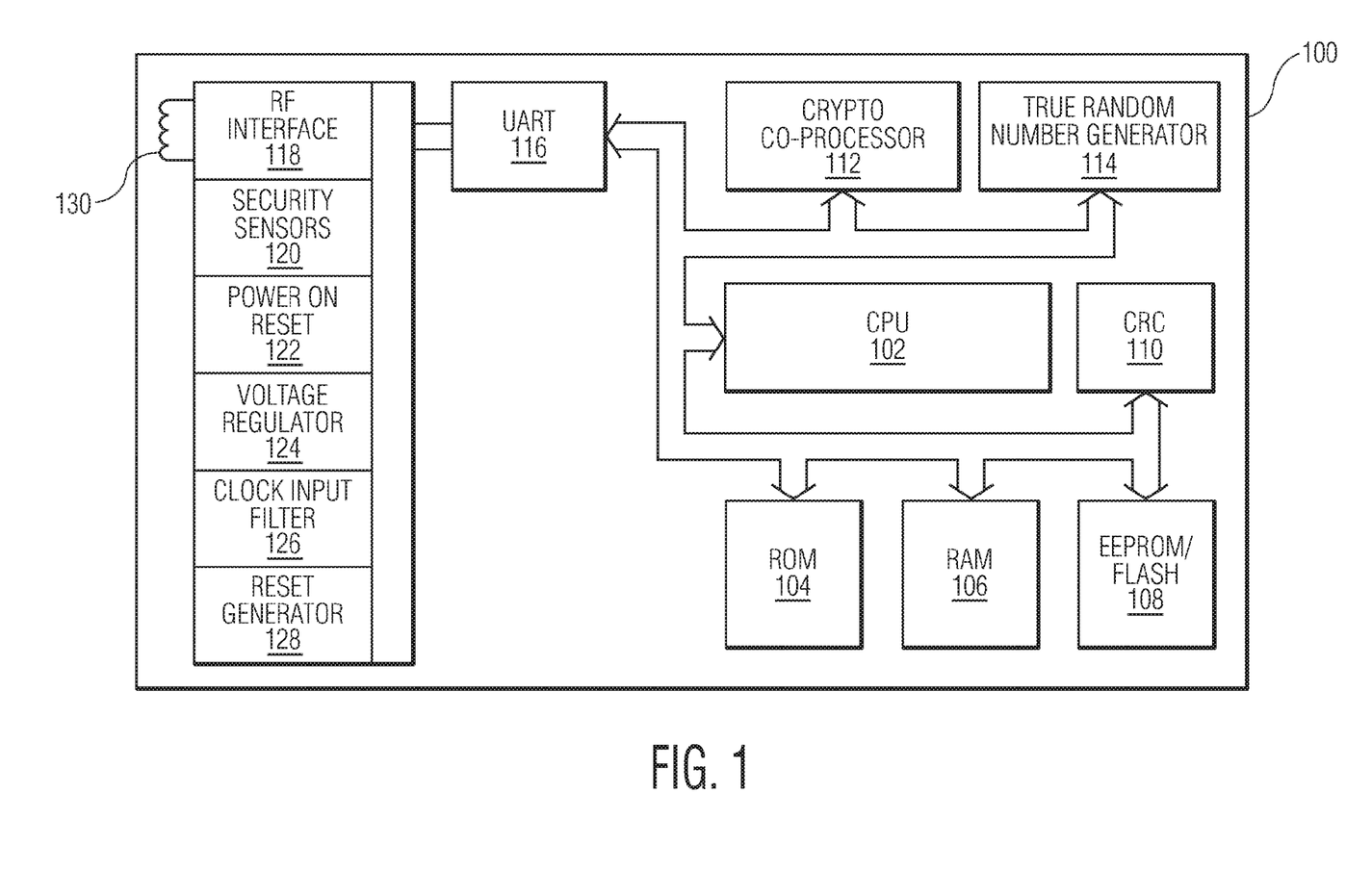
FIG. 1 is a block diagram of a typical contactless smart card.

FIG. 1 is a block diagram of a typical contactless smart card 100. The smart card includes a CPU 102, memory made up of ROM 104, RAM 106, and EEPROM/FLASH 108, a cyclic redundancy checker (CRC) 110, a crypto co-processor 112, a true random number generator 114, and a Universal Asynchronous Receiver/Transmitter (UART) 116 that interfaces with an RF interface 118, an RF antenna 130, security sensors 120, a power on reset 122, a voltage regulator 124, a clock input filter 126, and a reset generator 128. In other embodiments, the smart card can be emulated by a smart phone or can be embedded in a larger device (e.g., a mobile phone or larger electronic device).

Figure 2:
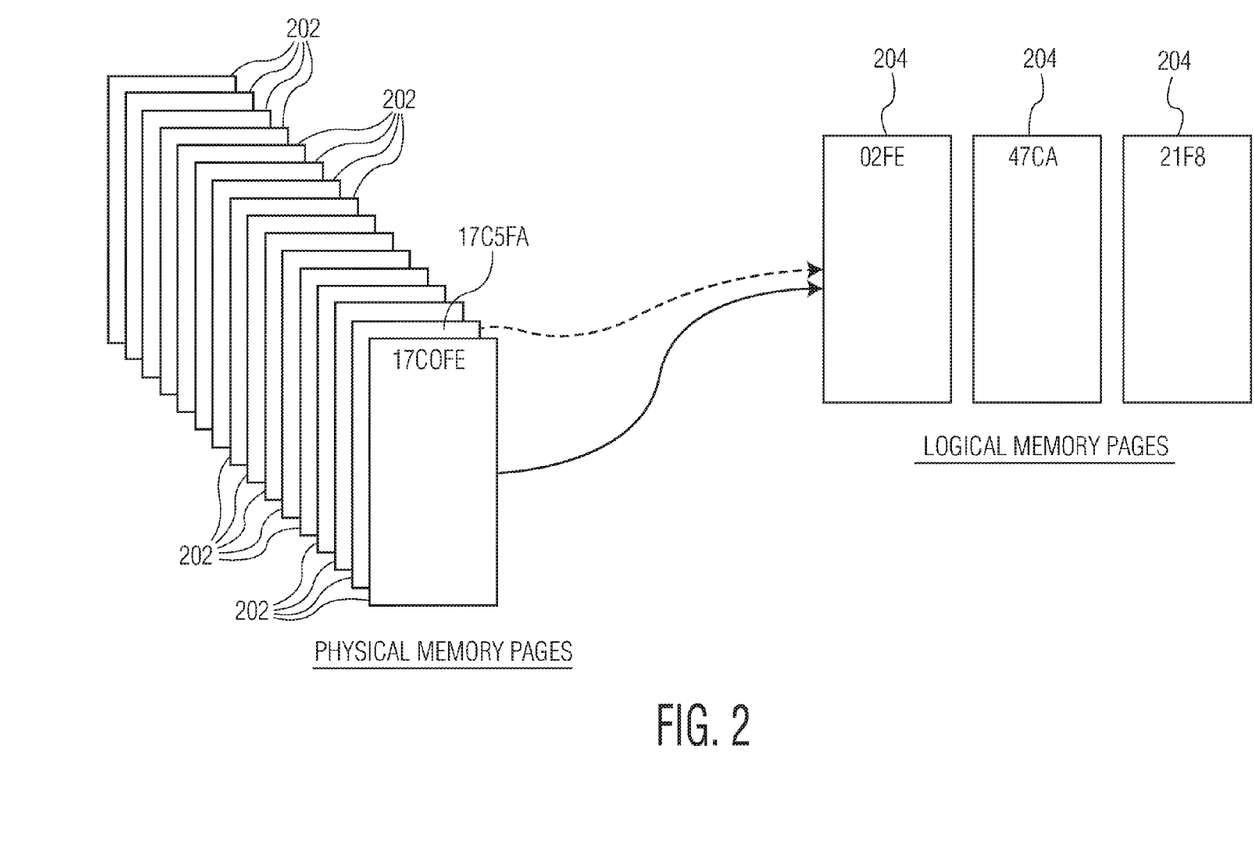
FIG. 2 illustrates the mapping of physical memory pages to logical memory pages.

Data stored in the memory of a smart card can be programmed and updated by writing data to physical pages of memory and then mapping the pages to logical memory pages. In an embodiment, a physical memory page is a block of memory identified by a physical address (e.g., a real address in a main memory of a device) and a logical memory page is a virtual page usable by an executing application. Physical memory pages are mapped to logical memory pages to update data stored on the logical memory pages. FIG. 2 illustrates the mapping of physical memory pages 202 to logical memory pages 204. When a logical memory page needs to be updated with new data, the new data can be programmed to a new physical memory page pointing to the logical memory page (e.g., containing the address of the logical memory page). After the data has been written to the physical memory page, the physical memory page can be mapped to the logical memory page indicated by the address contained in the physical memory page. For example, as illustrated in FIG. 2, physical memory page 17C0FE is mapped to logical memory page 02FE. When new data is programmed to physical memory page 17C5FA, physical memory page 17C5FA is mapped to logical memory page 02FE and physical memory page 17C0FE is erased and unmapped. In an embodiment, the physical memory page with the new data is mapped to the logical memory page before the physical memory page currently mapped to the logical memory page is unmapped, but the operations may be performed in the opposite order. In an embodiment, only one physical memory page can be mapped to a logical memory page at a time (or two while one of the pages is being erased), but other configurations are possible. In an embodiment, the mapping of physical memory pages to logical memory pages can be facilitated by recording links between physical and logical memory pages in a mapping table. For example, when a logical memory page is updated, a new physical memory page not linked in the mapping table (e.g., a previously unused or erased page) can be programmed with the updated data and an entry linking the new physical memory page to the logical memory page can be added to the mapping table, while the entry linking an old physical memory page to the logical memory page can be removed from the mapping table and the old physical memory page can be erased.

Figure 3:
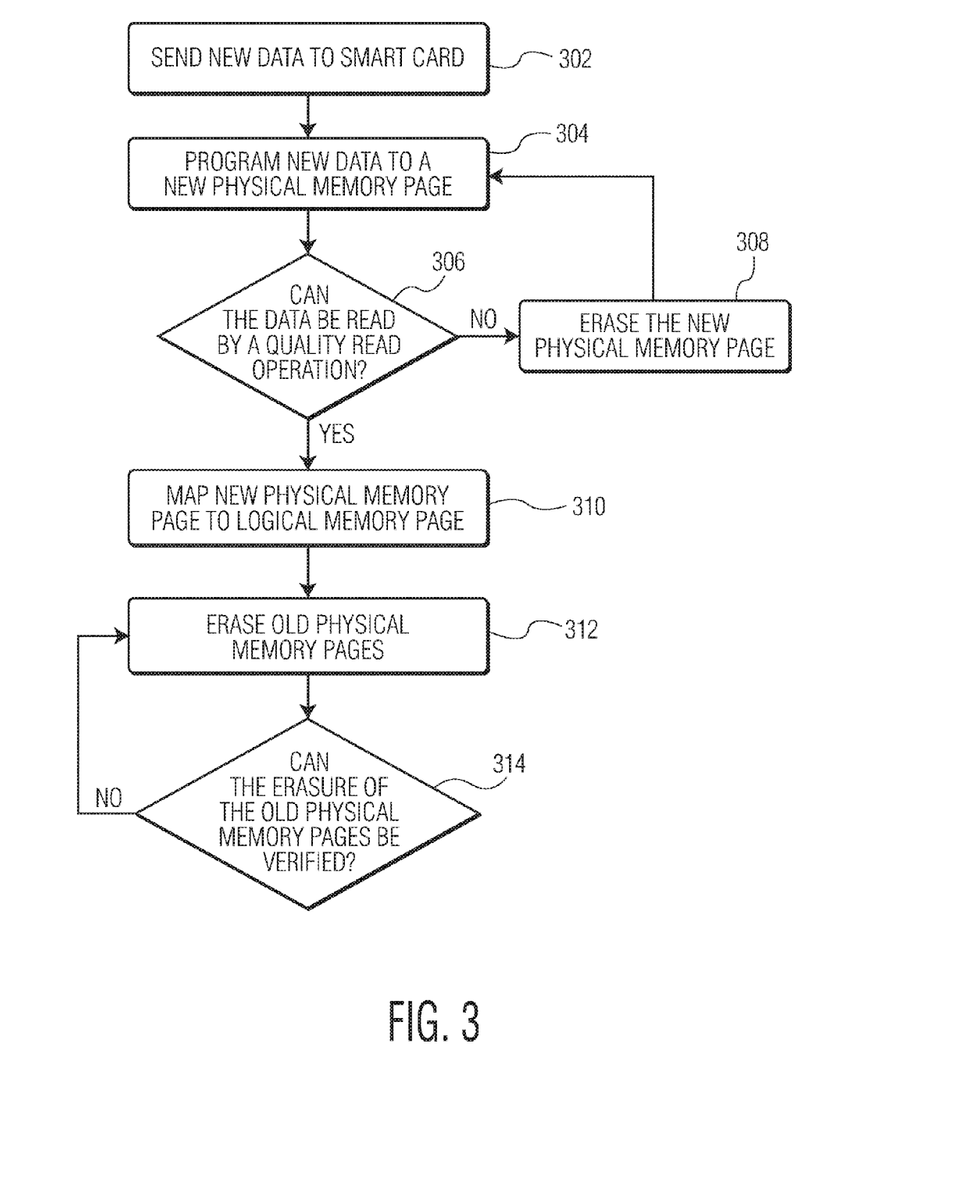
FIG. 3 is a flow chart diagram of a series of steps for updating memory of a smart card.

Typically, in order to update memory of a smart card, a series of steps may be performed. FIG. 3 is a flow chart diagram of a series of steps for updating memory of a smart card. At block 302, new data to be programmed to memory is sent to a smart card. At block 304, the new data is programmed to a physical memory page in the memory of the smart card. The physical memory page may be a blank physical memory page (e.g., a page to which data has not previously been programmed) or the physical memory page may be a physical memory page that was previously programmed to, but is no longer needed (e.g., not mapped to a logical memory page). At decision point 306, it is determined if the data programmed to the physical memory page can be read correctly by a quality read operation. In an embodiment, data can be read correctly by a quality read operation when cell characteristics (e.g., number of flipped bits, cell drift, or voltage) exceed those needed for data to be correctly read by a normal read operation and CRC data calculated from the data matches pre-computed CRC data stored on the physical memory page. For example, if the supply voltage for a normal read is 5V, then a quality read operation may use a supply voltage of only 3V. In an embodiment, a quality read operation is meant to simulate read operations under adverse conditions (e.g., large distance between the smart card and the smart card reader or other interferences between the smart card and the smart card reader). Thus, a quality read operation is performed to determine that data programmed to a smart card can be read under adverse conditions and, if the data can be read, then it can be presumed that the data can be read under normal conditions. If data cannot be read by a quality read operation, then, at block 308, the physical memory page is erased and the process returns to block 304 to re-write the new data to the physical memory page. If the data can be read by a quality read operation, then, at block 310, the physical memory page is mapped to the logical memory page and, at block 312, old physical memory pages (e.g., physical memory pages that had previously been mapped to the logical memory page) are erased. At decision point 314, it is verified if the old physical memory pages have been successfully erased. In an embodiment, a successful erasure is confirmed using a quality read operation to determine that a physical memory page no longer contains valid data (e.g., data that cannot be used to calculate a valid CRC data that matches pre-computed CRC data stored on the physical memory page). If the erasure is not verified, then the process returns to block 312 and the old data is erased again.

As described with reference to FIG. 3, the updating of memory in a smart card can be successfully performed when sufficient power and time to perform the above-described steps is available. As described above, contactless communication allows for a smart card to communicate with a reader without requiring direct contact with the reader. Accordingly, it may be possible for the smart card to be read with varying degrees of separation between the smart card and the reader (e.g., 2 cm-12 cm or more apart). As the separation increases, the voltage delivered to the smart card by the reader may decrease and, if the voltage drops sufficiently, the smart card may cease operations. If operations cease while memory is being updated, the update may fail. Additionally, operations can be interrupted or disturbed by disconnection from a terminal, disconnection from a power supply, depletion of a battery, manual reset by a user, or other externally-induced disturbs. Failure due to interruption and disturbance is referred to as a "tearing event." If a tearing event occurs, data may be corrupted.

Figure 4:
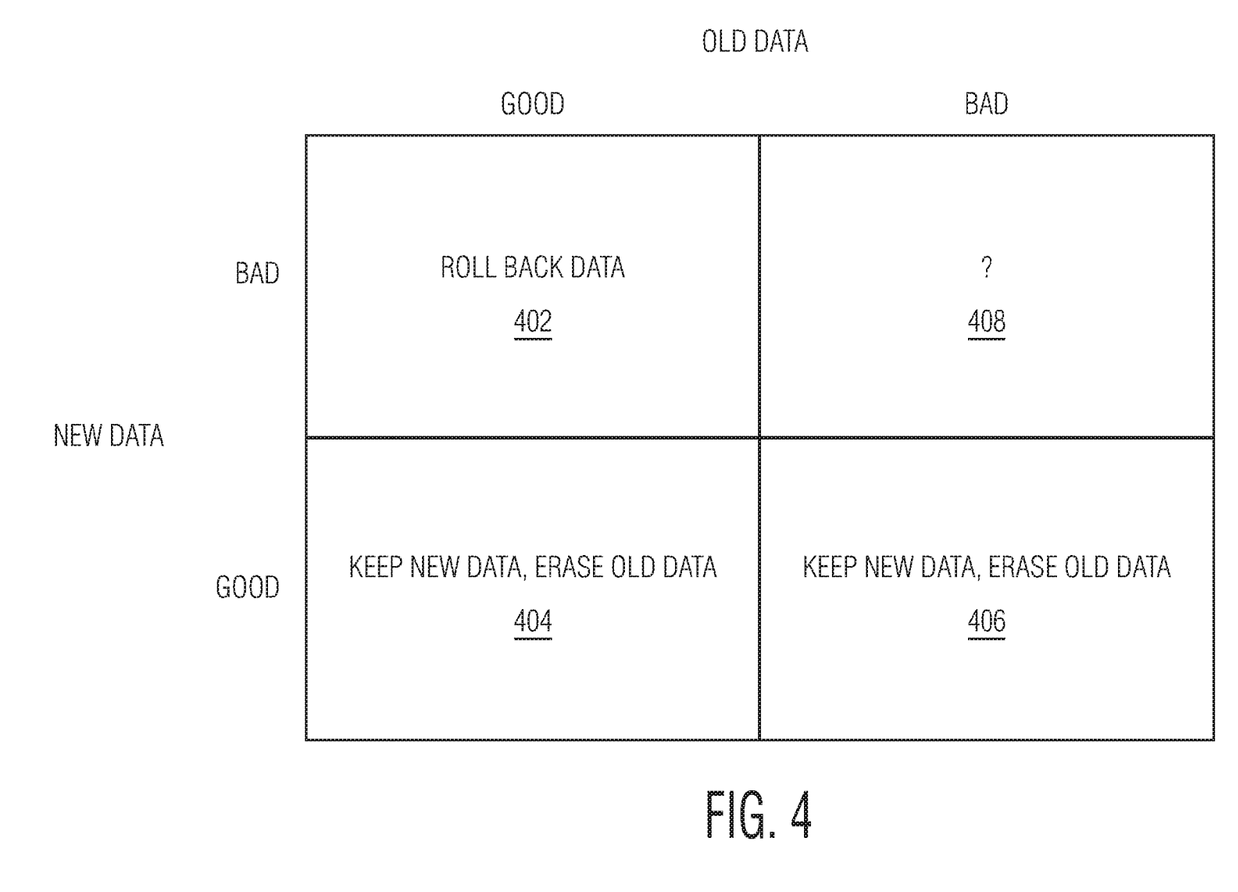
FIG. 4 is a chart illustrating four possible memory states after a tearing event has occurred.

FIG. 4 is a chart illustrating four possible memory states after a tearing event has occurred. Depending on at which step, as described with respect to FIG. 3, the tearing event occurs, one of the four memory states in FIG. 4 may occur. Depending on when the tearing event occurs, the memory can either be rolled back to before the memory update began or the update of the memory can be resumed (e.g., resume erasure of old physical memory pages). If the tearing event occurs when new data is being programmed to a new physical memory page and the new data is not properly programmed, then, as illustrated at quadrant 402, the data can be rolled back to restore the smart card memory to an operable state (e.g., a state in which data stored in memory can be correctly read via a quality read operation). If the tearing event occurs after the new data has been programmed to a new physical memory page, but before another physical memory page pointing to the logical memory page (e.g., containing the address of the logical memory page) has been erased such that two physical memory pages are now pointing to the same logical memory page, then a "collision" occurs. If the collision occurs before erasure of the old physical memory page has started, then, as illustrated at quadrant 404, since the new physical memory page and the old physical memory page can still be read correctly by a quality read operation, the new physical memory page can be kept and erasure of the old physical memory page can be performed. If the collision occurs after erasure of the old physical memory page has begun and the old physical memory page is no longer correctly readable by a quality read operation, but not fully erased, then, as illustrated at quadrant 406, the new physical memory page can be kept and erasure of the old physical memory page can be resumed. In an embodiment, the memory of a smart card can suffer disturbances due to, for example, high or low temperatures or strong magnetic exposure that can corrupt data. Disturbances often coincide with tearing events and collisions. If a collision occurs after erasure of the old physical memory page has begun, but the new physical memory page cannot be correctly read by a quality read operation (e.g., due to a disturbance) then, as illustrated at quadrant 408, the memory cannot roll back to the old physical memory page because it has already been at least partially erased and the new physical memory page cannot be kept either because the new physical memory page cannot be correctly read by a quality read operation.

Figure 5:
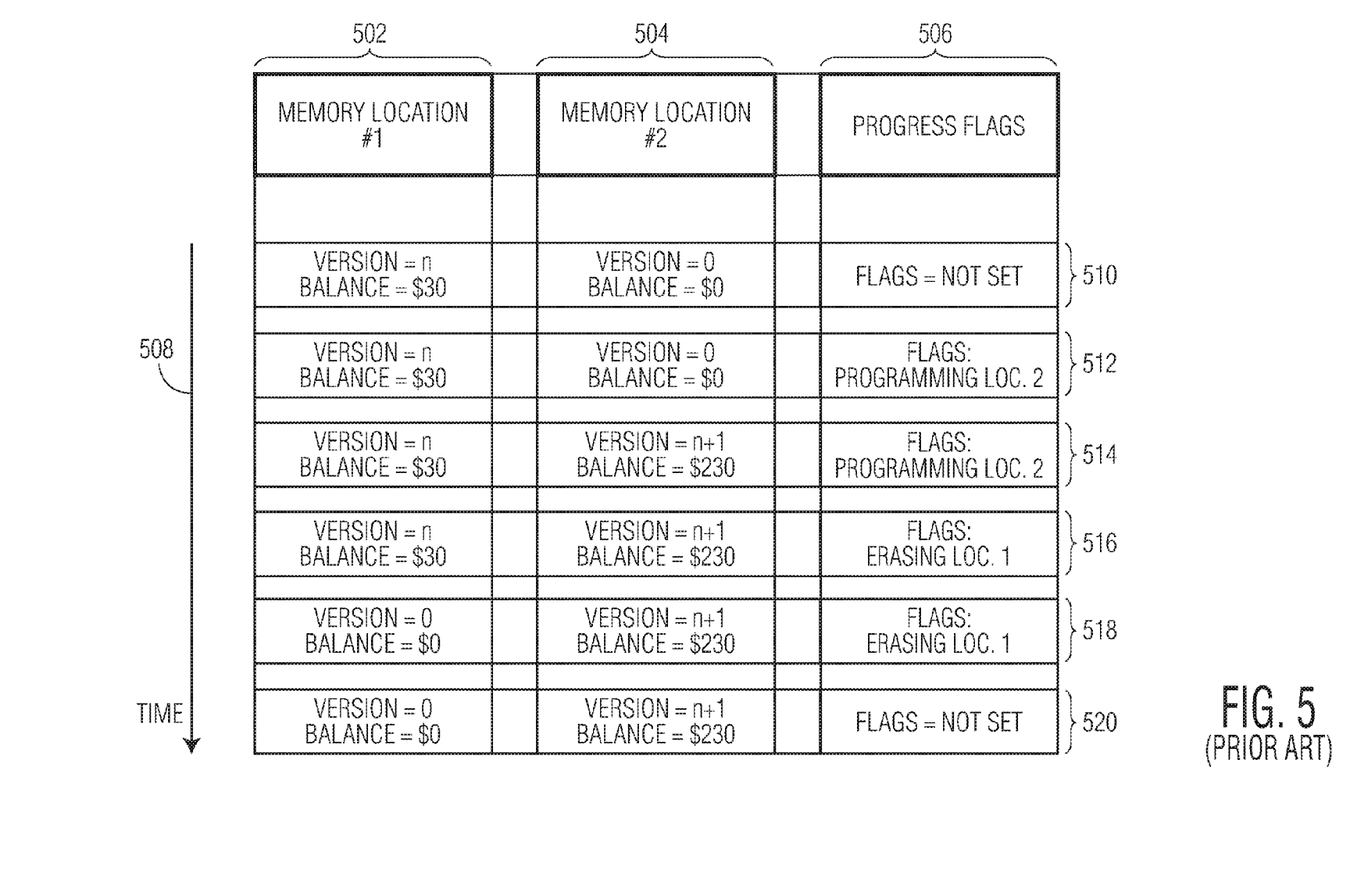
FIG. 5 illustrates a known technique for recovering smart card memory after a tearing event using progress flags.

A typical solution for restoring the memory to an operable state when a tearing event or a collision has occurred is to utilize additional progress flags. FIG. 5 illustrates a known technique for recovering smart card memory after a tearing event using progress flags. As illustrated in FIG. 5, the values of a first memory location (illustrated by a first column 502), a second memory location (illustrated by a second column 504), and a progress flag (illustrated by a third column 506) are shown over a period of time, as indicated by the y-axis 508. In the example illustrated in FIG. 5, a version number and a balance (e.g., for a bank account or other funding source) are stored at each memory location and one or more flags are stored at the progress flags location. Thus, at least three memory locations are required to implement the solution. Initially, as illustrated at row 510, the version is set to "n" and the balance is set to "$30" at memory location 1 and memory location 2 is not set (e.g., the version is set to 0 and the balance is set to $0). No progress flags have been set. Next, as illustrated at row 512, updating of memory location 2 begins and the progress flags are set to indicate that the last operation initialized on the smart card was the programming of memory location 2. At row 514, memory location 2 is updated in order to set the version to n+1 and to set the balance to $230. At row 516, the progress flags are set to indicate that the erasure of memory location 1 has begun. At row 518, the version number is reset to 0 and the balance is also reset to $0 at memory location 1. At row 520, the progress flags are also reset. By checking the progress flags when a smart card initializes (e.g., receives enough voltage to power on after a tearing event), the reader and smart card can easily determine how to restore the smart card to an operable state (e.g., roll back the data or keep the new data and re-erase the old). However, allocating memory space for the progress flags may require a smart card to be configured with additional memory and may require additional writes to set and reset the progress flags, which can create a significant time overhead.

In accordance with an embodiment of the invention, a method for resolving collisions resulting from tearing events when updating memory (e.g., memory of a smart card) is disclosed. In the embodiment, the method involves selecting a memory page from a plurality of memory pages pointing to a logical memory page based on version information, re-programming the selected memory page, and mapping the selected memory page to the logical memory page. A memory page points to the logical memory page indicated by the logical address contained in the memory page. In an embodiment, the selected memory page is re-programmed (e.g., data is programmed over the data currently programmed to the selected memory page without first erasing the selected memory page in order to strengthen the readability of the data) with data obtained by a normal read operation. Thus, if the occurrence of a tearing event disturbs the programming of a physical memory page, the physical memory page can be re-programmed and mapped to a logical memory page with a reduced time overhead than is required by typical anti-tearing solutions.

Figure 6:
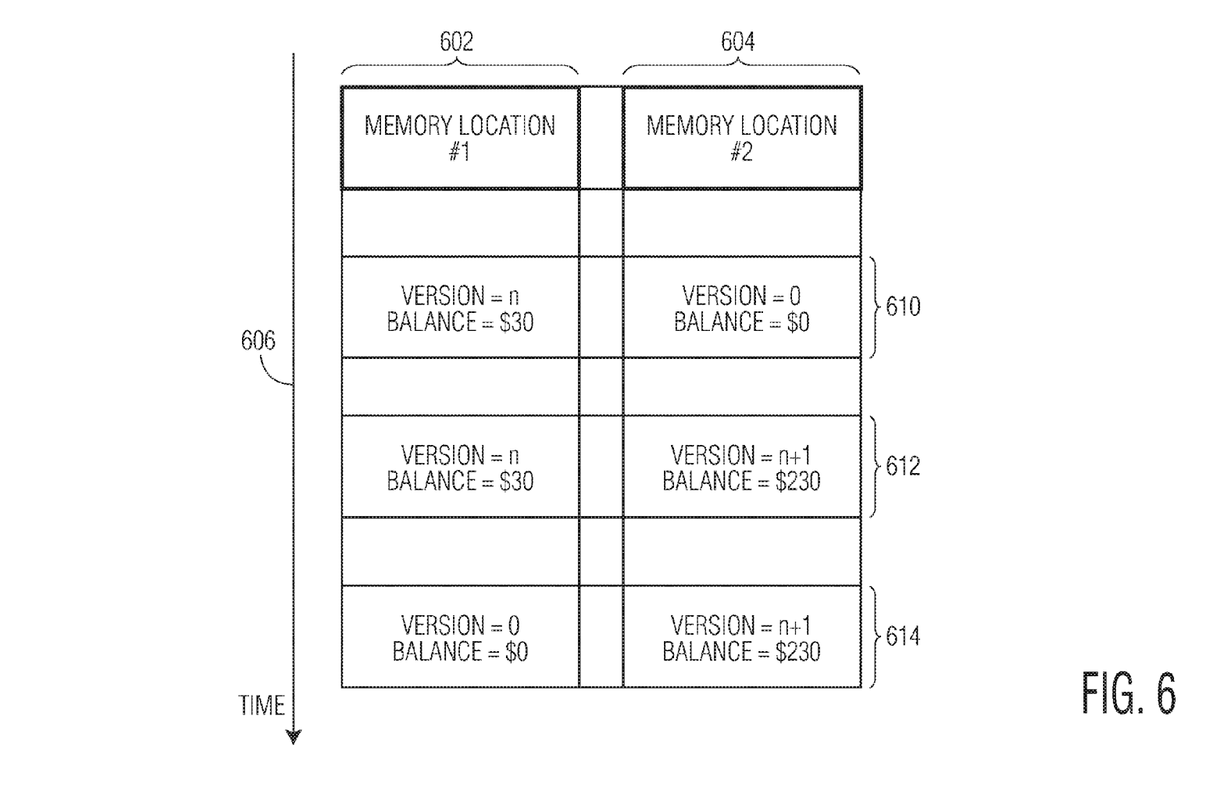
FIG. 6 illustrates a technique for updating a logical memory page in memory of a smart card in accordance with an embodiment of the invention.

FIG. 6 illustrates a technique for updating a logical memory page in memory of a smart card in accordance with an embodiment of the invention. Similar to FIG. 5 above, the values of a first memory location (illustrated by a first column 602) and a second memory location (illustrated by a second column 604) are shown over a period of time, as indicated by the y-axis 606. Initially, at row 610, the version is set to "n" and the balance is set to "$30" at memory location 1 and memory location 2 has not been set. At row 612, the version at memory location 2 is updated to "n+1" and the balance is updated to "$230". At row 614, memory location 1 is erased (e.g., version is set to "0" and balance is set to "$0"). Additional memory to store progress flags is not required and additional writes to update progress flags are not required. Thus, a greater amount of smart card memory can be allocated to data storage and updating data can be performed with fewer write operations.

Using the technique for updating a logical memory page described above with reference to FIG. 6, when the reader and the smart card re-enter a proximity that allows for the smart card to power up again after a tearing event, the reader and smart card determine what operation to perform (e.g., keep the new physical memory page, roll back to the old physical memory page, or re-program the new physical memory page) based on whether a physical memory page can be correctly read via a quality read operation. For example, if a new physical memory page can be correctly read via a quality read operation, then the new physical memory page will be kept and the old physical memory page will continue to be erased (as illustrated by FIG. 4 above). Alternatively, if the new physical memory page cannot be correctly read via a quality read operation, then the new physical memory page may be re-programmed if data can be read from the physical memory page with a normal read operation or, if the old physical memory page can still be correctly read via a quality read operation, the smart card memory can be rolled back to the old physical memory page.

Figure 7:
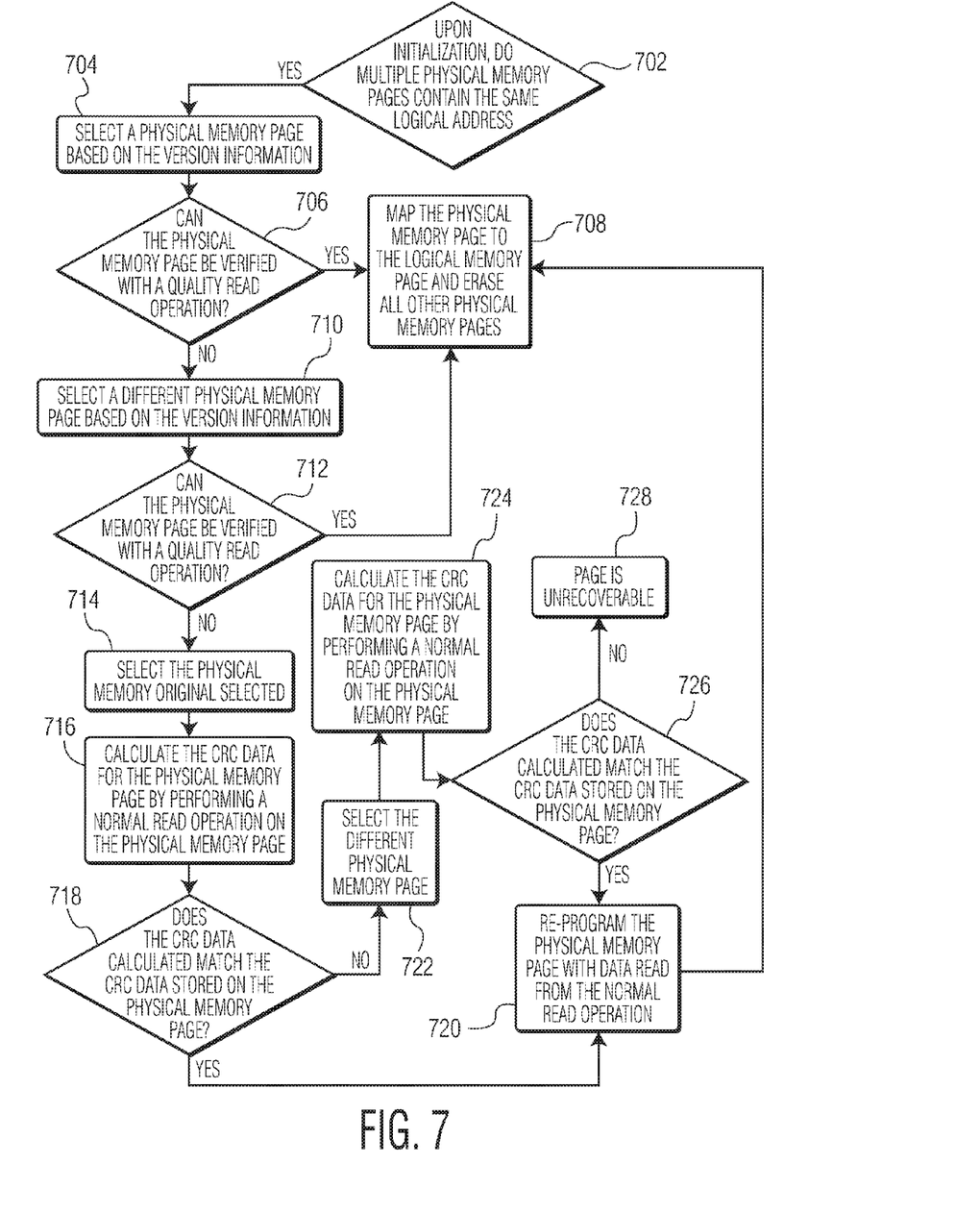
FIG. 7 is a flow chart diagram of a technique for resolving collisions resulting from tearing events when updating smart card memory in accordance with an embodiment of the invention.

FIG. 7 is a flow chart diagram of a technique for resolving collisions resulting from tearing events when updating smart card memory in accordance with an embodiment of the invention. The steps depicted in FIG. 7 can be performed when a tearing event occurs during any step described above with reference to FIG. 3. When a smart card initializes, the smart card reads the logical address contained within each physical memory page. At decision point 702, after the smart card has finished initializing, it determines whether multiple physical memory pages contain the same logical address (e.g., point to the same logical memory page). In an embodiment, each physical memory page contains the address of a logical memory page to which the physical memory page should be mapped. If the address of each logical memory page is contained in only one physical memory page, then no collisions have occurred and the technique exits. If a collision has occurred, then, at block 704, a physical memory page is selected based on the version information of the physical memory page. In an embodiment, the physical memory page is also selected based on the performance of a quality read operation. For example, if a page cannot be correctly read by a quality read operation, then the page may not be selected and the previous version of the page that can be correctly ready by a quality read operation may be selected instead. In an embodiment, the physical memory page is part of a plurality of physical memory pages that point to the same logical memory page (e.g., contain the address of the logical memory page) and the version information, which can be stored in an XWORD of the physical memory page, indicates which physical memory page was most recently programmed. For example, the first iteration of a page may be version number "1" and the second iteration maybe version number "2". A limited list of numbers (e.g., 1, 2, 3, and 0) can be used in a continuous loop (e.g., 1<2<3<0<1) in order to indicate the page version using a limited number of bits. At decision point 706, the smart card determines if the selected physical memory page can be verified by a quality read operation. In an embodiment, a page can be verified by a quality read operation if CRC data can be calculated for the page when read by a quality read operation and the calculated CRC data matches CRC data stored in the page (e.g., in an XWORD). In an embodiment, the physical memory page can be verified by more than one quality read operation (e.g., at 0.1V, 0.2V, and at 0.5V). If the physical memory page can be verified by a quality read, then, at block 708, the physical memory page is mapped to the logical memory page and all other physical memory pages pointing to the logical memory page are erased. If the physical memory page cannot be verified, then, at block 710, a different physical page is selected based on the version information. At decision point 712, it is determined if the different physical memory page can be verified with a quality read operation. If the different physical memory page can be verified, then, at block 708, the different physical memory page is mapped to the logical memory page and all other physical memory pages pointing to the logical memory page are erased. If the different physical memory page cannot be verified, then, at block 714, the physical memory page original selected (e.g., the physical memory page selected at block 704) is selected. At block 716, CRC data for the physical memory page is calculated by performing a normal read operation on the physical memory page. At decision point 718, the calculated CRC data is compared to the CRC data stored on the physical memory page (e.g., in an XWORD). If the CRC data does not match, then, at block 722, the different physical memory page is selected and, at block 724, CRC data for the different physical memory page is calculated by performing a normal read operation on the different physical memory page. At decision point 726, the calculated CRC data for the different physical memory page is compared to the CRC data stored on the physical memory page (e.g., in an XWORD). If the CRC data does not match, then, as indicated at block 728, an error occurs and the logical memory page is not recoverable. If, at decision point 718 or at decision point 726, the CRC data does match, then at block 720, the physical memory page is re-programmed with data read from the physical memory page by the normal read operation when calculating CRC data for the physical memory page and, at block 708, the physical memory page is mapped to the logical memory page and all other physical memory pages pointing to the logical memory page are erased. In an embodiment, the process can be repeated after each tearing event until a physical memory page with the latest version number can be verified by a quality read operation.

Figure 8:
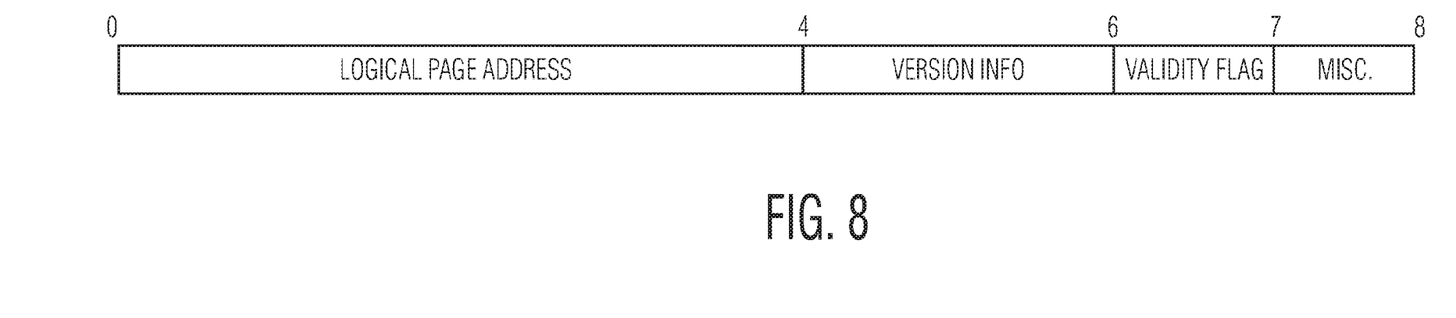
FIG. 8 is a diagram of a configuration of an WORD in accordance with an embodiment of the invention.

As described with reference to block 704 and block 710 of FIG. 7, version information and CRC data can be obtained from an XWORD of a physical memory page. FIG. 8 is a diagram of a configuration of an XWORD in accordance with an embodiment of the invention. As illustrated in FIG. 8, an XWORD includes a logical memory page address to which the physical memory page should be mapped, version information for the physical memory page, a validity check flag, and other miscellaneous information. In an embodiment, the logical memory page address has a width that is equal to the number of bits needed to address a memory row in the memory of a smart card. Version information can be a two bit field that includes, for example, a version number (e.g., 0<1<2<3<0<1 and so on) or a timestamp. In an embodiment, the validity check flag, which can be handled by a dedicated flag or by coding within the physical memory page, can be configured to distinguish between an erased page and a page with zero content, but other means (e.g., error-correcting code encoding, CRC encoding, n-out-of-m coding, etc.) can be used to distinguish as well. For example, if the first time data is written to a physical memory page the version is set to 0 and the balance is set to $0, then the physical memory page will look identical to an erased page (e.g., version=0 and balance=$0). Thus, the validity check can be used to determine if the page is valid or erased. The XWORD can also include miscellaneous information such as, for example, CRC data for the XWORD itself. In an embodiment, the XWORD further includes CRC data of other words within the same page. While the above fields are described with reference to a single XWORD, multiple XWORDs, words, or stores can be used to encode the above-described fields directly within a page and/or indirectly within a separate page. In another embodiment, the information within the above-described fields can be obtained from data of the page outside of an XWORD.

In an embodiment, the above described technique for resolving collisions resulting from tearing events when updating smart card memory determines which physical memory pages are valid (e.g., programmed and not merely erased or unused) when re-initializing after a tearing event. In an embodiment, a validity check can be performed on physical memory pages in the memory of a smart card to determine which physical memory pages are valid. The validity check can be performed by evaluating the validity check flag for each physical memory page, as described above with reference to the XWORD of FIG. 8. The validity check can also be performed by verifying CRC data in an XWORD for a physical memory page after the physical memory page has been read (e.g., by a normal read operation). For example, if the CRC data for a physical memory page is not correct (e.g., CRC data calculated from the data of the physical memory page does not match previously calculated CRC data stored in XWORD of the physical memory page), then the physical memory page will not be determined to be valid. Other techniques for determining the validity of a physical memory page are envisioned as well.

In an embodiment, after determining which pages of physical memory are valid, a smart card and/or a smart card reader determines if a tearing event has occurred. However, a tearing event can occur without causing a collision and, thus, would not trigger the additional steps described above (e.g., re-programming a physical memory page). In an embodiment, the occurrence of a tearing event can be determined by reading data programmed to a system page that is stored as a logical memory page in memory of a smart card. In an embodiment, in order to determine if a tearing event has occurred, the system page can be updated when updating of a logical memory page begins and be updated again when updating is complete. Thus, if a system page indicates that updating of a local memory page has begun, but does not indicate that updating is complete, it can be determined that a tearing event has occurred.

After tearing events occur, it can be difficult to determine where the operation to update smart card memory should resume (e.g., programming new data, erasing old data, or re-programming new data). Progress flags may require additional memory and write actions. In accordance with an embodiment of the invention, collisions between physical memory pages can be identified when a smart card is initialized via a normal read operation and resolved by performing a quality read operation and reprogramming physical memory pages that cannot be correctly read by the quality read operation. Accordingly, additional memory for process flags is not required and the additional write operations to update the process flags are not required.

In an embodiment, the updating of memory pages as described above can be facilitated by an integrated circuit. The integrated circuit may include the elements described above with reference to FIG. 1, but may exclude some elements and include other elements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details.

In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for resolving collisions resulting from tearing events when updating memory, the method comprising:
    selecting a memory page from a plurality of memory pages pointing to a logical memory page based on version information;
    re-programming the selected memory page; and
    mapping the selected memory page to the logical memory page.

2. The method of claim 1, wherein the memory page is further selected based on performance under a quality read operation.

3. The method of claim 1, further comprising re-programming the selected memory page using cyclic redundancy checked (CRC) data for the memory page obtained by performing a normal read operation of the page.

4. The method of claim 3, wherein if CRC data for the selected memory page (first memory page) cannot be obtained by a normal read operation:
    selecting a second memory page from the plurality of memory pages pointing to the logical memory page; and
    re-programming the second memory page using CRC data obtained by performing a normal read operation of the second memory page.

5. The method of claim 1, wherein the selected memory page is verified with a quality read operation and, if the page cannot be verified, re-programming the memory page.

6. The method of claim 1, wherein the method further comprises determining if a tearing event has occurred by reading data programmed to a system page before selecting the memory page.

7. The method of claim 1, wherein a validity check is performed before re-programming the memory page.

8. The method of claim 7, wherein the validity check is performed by evaluating a validity check flag stored in an XWORD of the memory page.

9. The method of claim 7, wherein the validity check is performed by comparing CRC data calculated from the memory page to CRC data stored in an XWORD of the memory page.

10. A non-transitory computer-readable storage medium comprising instructions that, when executed by a processor, cause the processor to perform steps including:
    selecting a memory page from a plurality of memory pages pointing to a logical memory page based on version information; and
    re-programming the selected memory page; and
    mapping the selected memory page to the logical memory page.

11. The non-transitory computer-readable storage medium of claim 10, wherein the memory page is further selected based on performance under a quality read operation.

12. The non-transitory computer-readable storage medium of claim 10, wherein the memory page is selected from a plurality of physical memory pages that are mapped to the same logical memory page.

13. The non-transitory computer-readable storage medium of claim 10, wherein the non-transitory computer-readable storage medium further comprises instructions for re-programming the selected memory page using cyclic redundancy checked data obtained by performing a normal read operation of the page.

14. The non-transitory computer-readable storage medium of claim 10, wherein the selected memory page is verified with a quality read operation and, if the page cannot be verified, re-programming the memory page.

15. The non-transitory computer-readable storage medium of claim 10, wherein if cyclic redundancy checked data for the selected memory page (first memory page) cannot be obtained by a normal read operation:
    selecting a second memory page from the plurality of memory pages pointing to the logical memory page; and
    re-programming the second memory page using cyclic redundancy checked data obtained by performing a normal read operation of the second memory page.

16. The non-transitory computer-readable storage medium of claim 10, wherein an occurrence of a tearing event is determined by reading data programmed to a system page before selecting the memory page.

17. The non-transitory computer-readable storage medium of claim 10, wherein a validity check is performed before re-programming the memory page.

18. The non-transitory computer-readable storage medium of claim 17, wherein the validity check is performed by evaluating a validity check flag stored in an XWORD of the memory page.

19. The non-transitory computer-readable storage medium of claim 17, wherein the validity check is performed by comparing CRC data calculated from the memory page to CRC data stored in an XWORD of the memory page.

20. An integrated circuit comprising a processor and memory, the memory containing instructions that, when executed by the processor, perform steps comprising:
    selecting a memory page from a plurality of memory pages pointing to a logical memory page based on version information; and
    re-programming the selected memory page; and
    mapping the selected memory page to the logical memory page.

* * * * *